(12) United States Patent
Durrant

(10) Patent No.: US 7,234,038 B1
(45) Date of Patent: Jun. 19, 2007

(54) PAGE MAPPING COOKIES

(75) Inventor: Paul Durrant, Farnham Royal (GB)

(73) Assignee: Sun Microsystems, Inc., Santa Clara, CA (US)

( * ) Notice: Subject to any disclaimer, the term of this patent is extended or adjusted under 35 U.S.C. 154(b) by 398 days.

(21) Appl. No.: 10/857,149

(22) Filed: May 28, 2004

(51) Int. Cl.
*G06F 12/00* (2006.01)

(52) U.S. Cl. ............... 711/203; 711/133; 711/205; 711/207

(58) Field of Classification Search ............... None
See application file for complete search history.

(56) References Cited

U.S. PATENT DOCUMENTS

| | | | | |
|---|---|---|---|---|
| 5,706,461 | A * | 1/1998 | Branstad et al. ............ | 711/203 |
| 5,893,152 | A * | 4/1999 | Fuller et al. ............... | 711/141 |
| 6,175,906 | B1 * | 1/2001 | Christie .................... | 711/207 |
| 6,408,373 | B2 * | 6/2002 | Burger et al. ............. | 711/207 |
| 7,069,413 | B1 * | 6/2006 | Agesen et al. ............. | 711/207 |
| 7,171,539 | B2 * | 1/2007 | Mansell et al. ............ | 711/203 |

OTHER PUBLICATIONS

Andrew S. Tanenbaum and Albert S. Woodhull, Operating Systems: Design and Implemention, 1997, Prentice Hall, 2nd edition, pp. 329-330.*

* cited by examiner

*Primary Examiner*—Reginald Bragdon
*Assistant Examiner*—Shawn Gu
(74) *Attorney, Agent, or Firm*—Osha Liang LLP

(57) ABSTRACT

A method for managing virtual memory including placing a first virtual memory page in a physical memory page to create a virtual-to-physical memory mapping, associating a first page mapping cookie value with the virtual-to-physical memory mapping, determining whether the virtual-to-physical memory mapping is valid using the first page mapping cookie value, and performing a memory operation addressing the first virtual memory page if the virtual-to-physical memory mapping is valid.

18 Claims, 8 Drawing Sheets

PAGE MAPPING COOKIES

BACKGROUND

In a computer system, virtual memory management automates the movement of instructions and data between physical memory and secondary storage (e.g., disk storage, etc.) giving the appearance of a single, large memory unit. Conceptually, the address space of a processor is divided into virtual memory pages of a uniform size and the physical memory is divided into physical memory pages of the same size. While applications are executing, the operating system (OS) and the memory management unit (MMU) of the processor work together to move virtual memory pages into and out of the physical memory pages as needed. The OS and MMU use virtual-to-physical address mapping information to translate virtual memory addresses from the processor into physical memory addresses behind the scenes, creating the illusion of a single-level store with access time of random-access memory rather than that of secondary storage.

In many virtual memory implementations, virtual-to-physical address mapping information is stored in memory management data structures managed by the OS and is cached in a translation lookaside buffer (TLB) in the MMU. This virtual-to-physical address mapping information generally includes a virtual page number. If the virtual memory page is in physical memory, the virtual-to-physical address mapping information also contains the physical page number of the physical memory page containing the virtual memory page. Other information may also be included such as whether the page holds executable code and whether the page can be modified, and, if so, by whom. In complex virtual memory management systems supporting multiple address space contexts, the mapping information may also include an address space context identifier.

The virtual-to-physical address mapping information may be stored in different formats, depending on the virtual memory implementation. In some implementations, the memory management data structures are referred to as page tables and the virtual-to-physical address mapping information is stored as a page table entry (PTE). The PTEs are stored in the format expected by the TLB and are moved without translation from the page table to the TLB by the OS and/or hardware page table handlers. In more complex virtual memory management implementations, more complex data structures may exist that represent the state of the virtual memory. For example, in some systems, the OS creates translation table entries (TTEs) (i.e., entries that include the virtual-to-physical address mapping information) by extracting the mapping information from the more complex software representation. These TTEs are stored in an intermediate software cache known as a translation software buffer (TSB). The TTEs are stored in the format expected by the TLB. The OS uses the TSB to load entries in the TLB. A TTE and a PTE are functionally equivalent; each holds virtual-to-physical address mapping information for a single virtual memory page. Hereinafter, any reference to a mapping entry applies equally to a PTE or a TTE.

The TLB is a cache of mapping entries for recently used virtual memory pages. The TLB takes as input a virtual page identifier including at least a virtual page number and returns the corresponding physical page number if the mapping entry identified by the virtual page identifier is in the TLB. When the processor requests a fetch or store operation from virtual memory, the virtual address is passed to the MMU. The virtual page identifier from the virtual address is provided to the TLB. If the corresponding mapping entry is in the TLB, the corresponding physical page number is returned and the MMU creates a physical memory address using the physical page number and indexing information from the virtual address and puts the physical address on an address bus. If the mapping entry is not in the TLB, a TLB miss occurs.

The TLB miss is handled by moving a mapping entry corresponding to the virtual address into the TLB, which may be done in hardware, by the OS, or by some combination of the two. In general, if the requested virtual memory page is in physical memory, the corresponding mapping entry is placed in the TLB and the address translation is completed. A page fault occurs if a requested virtual memory page is not mapped into physical memory such as when the virtual memory page has never been accessed, has never been created, or has been swapped out to secondary storage to make room in physical memory for another virtual memory page.

If a page fault occurs and the desired virtual memory page is in secondary storage, the OS copies the virtual memory page into a physical memory page and updates the mapping entry accordingly. If the virtual memory page has not been created, the OS creates a new virtual memory page and places it in a physical memory page, updating the mapping entry accordingly. If a physical memory page is not available, the OS makes room for the requested virtual memory page by demapping and swapping out another virtual memory page. If a virtual memory page is demapped, the OS ensures that any references to the demapped page are removed from the TLB and from any cache. After the page fault is handled, the updated mapping entry for the loaded page is placed in the TLB and the address translation is completed.

In a multiprocessor, shared-memory computer system, each processor has an MMU and TLB while sharing physical memory with the other processors. At any given time during execution, the same mapping entry may be in the TLBs of multiple of the processors. Data or instructions from the virtual memory page may also be represented by the mapping entry in multiple of the processors' caches. If a mapping entry is in a TLB, the associated page is assumed to be in physical memory. Therefore, if the OS demaps a virtual memory page, the OS ensures that all processors are aware of the change. That is, the OS ensures that the TLBs and any affected caches are coherent. In some implementations, the OS maintains this coherency by making a cross call to all processors. The act of performing a cross call forces each processor to flush the mapping entry representing the demapped virtual memory page from the processor's TLB and to flush affected entries from the processor's caches. Cross calls are essentially CPU-to-CPU interrupts, typically used for MMU related coherency tasks. The cross call operation may force a potentially unnecessary synchronization, i.e., the page mapping affected may never be used again by one or more of the processors or one or more of the processors may not have the mapping.

SUMMARY

In general, in one aspect, the invention relates to a method for managing virtual memory including placing a virtual memory page in a physical memory page to create a virtual-to-physical memory mapping, associating a page mapping cookie value with the virtual-to-physical memory mapping, determining whether the virtual-to-physical memory mapping is valid using the page mapping cookie value, and performing a memory operation addressing the virtual memory page if the virtual-to-physical memory mapping is valid.

In general, in one aspect, the invention relates to a method for managing virtual memory including: placing a mapping entry for a virtual memory page in a translation lookaside buffer of a processor, wherein the mapping entry includes a page mapping cookie value associated with a physical memory page containing the virtual memory page; receiving a virtual memory address addressing the virtual memory page when a memory operation is initiated on the processor; translating the virtual memory address to a physical memory address using the mapping entry; extracting the page mapping cookie value from the mapping entry; and, completing the memory operation using the physical memory address if the page mapping cookie value is the same as a stored page mapping cookie value associated with the physical memory page.

In general, in one aspect, the invention relates to a virtual memory management system including a processor having a memory management unit, a memory controller operatively connected to the memory management unit to receive a page mapping cookie value, a memory operatively connected to the memory controller wherein the memory includes at least one physical memory page, and a translation lookaside buffer operatively connected to the memory management unit wherein the translation lookaside buffer stores a mapping entry including the page mapping cookie value and a virtual-to-physical memory mapping, wherein the memory controller uses the page mapping cookie value to determine whether the virtual-to-physical memory mapping is valid, and a memory operation requested by the processor is completed if the virtual-to-physical memory mapping is valid.

In general, in one aspect, the invention relates to a computer system including a plurality of processors, a memory operatively connected to the plurality of processors, a storage device, and software instructions stored on the storage device for enabling the computer system to: place a virtual memory page in a physical memory page to create a virtual-to-physical memory mapping; associate a page mapping cookie value with the virtual-to-physical memory mapping; determine whether the virtual-to-physical memory mapping is valid using the page mapping cookie value; and, perform a memory operation addressing the first virtual memory page if the virtual-to-physical memory mapping is valid.

Other aspects of the invention will be apparent from the following description and the appended claims.

DETAILED DESCRIPTION

Figure 1:
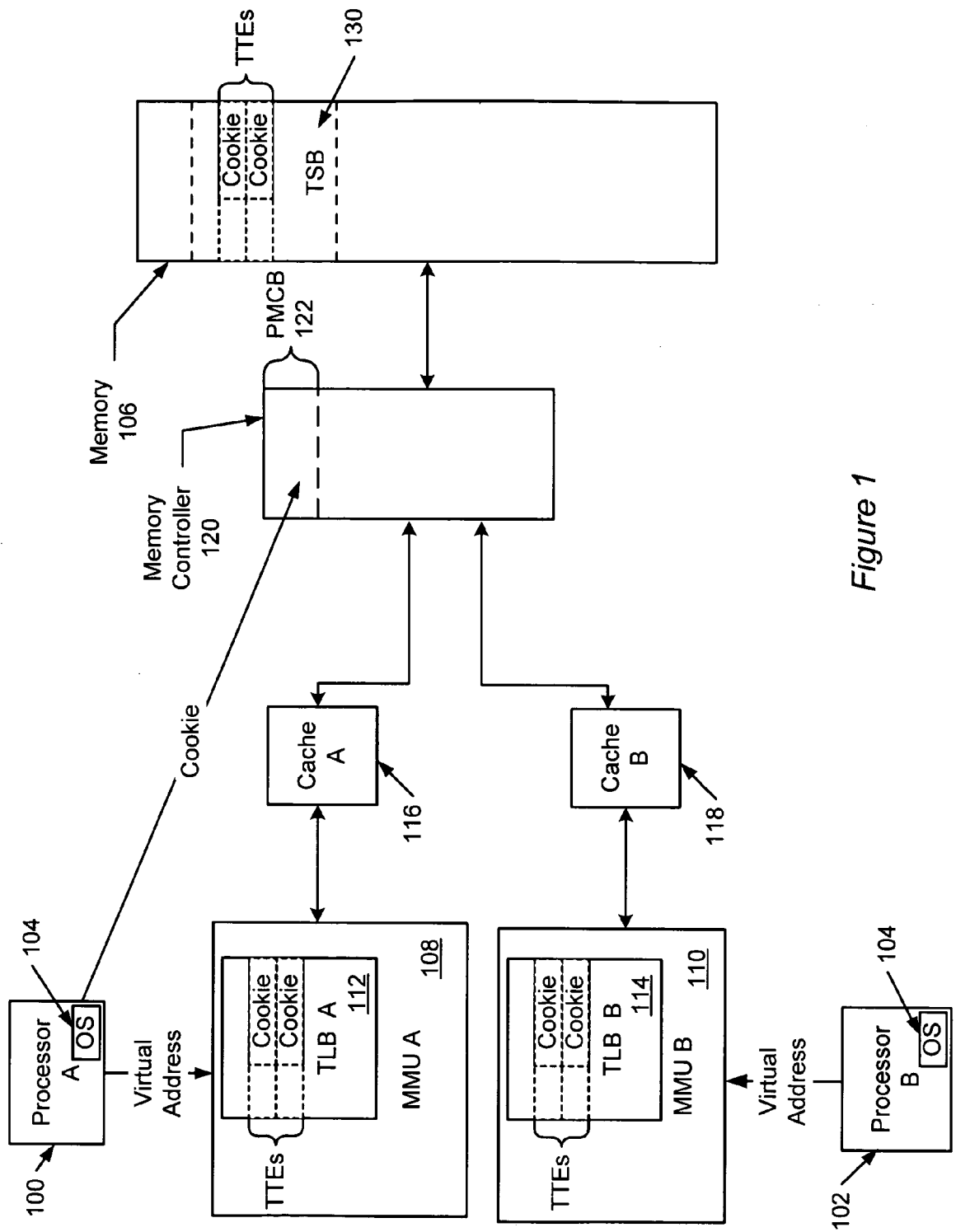
FIG. 1 shows a flow diagram of a symmetric multiprocessor system with a virtual memory management system in accordance with one or more embodiments of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In one embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The present invention relates to methods and apparatus for managing virtual memory on a shared-memory, symmetric multiprocessor system using page mapping cookies. Rather than cross calling all processors to synchronize the processors' TLBs and caches when a virtual memory page is demapped, the OS uses page mapping cookies associated with physical memory pages to synchronize the TLBs and caches as needed.

FIG. 1 shows a symmetric multiprocessor system with a virtual memory management system using page mapping cookies in accordance with one or more embodiments of the invention. The processors (100, 102) share a single copy of the OS (104) and system resources such as a common bus (not shown), a memory controller (120), memory (106), and an I/O system (not shown). Each processor includes a memory management unit (108, 110) and a cache (116, 118). Each memory management unit includes a translation lookaside buffer (112, 114). The architecture implements a snoopy cache protocol to maintain coherency among the caches (116, 118). One skilled in the art will appreciate that a multiprocessor system can include more than two processors, that each processor can have multiple caches and multiple TLBs, and that other cache coherency protocols may be used alone or in combination.

Figure 2:
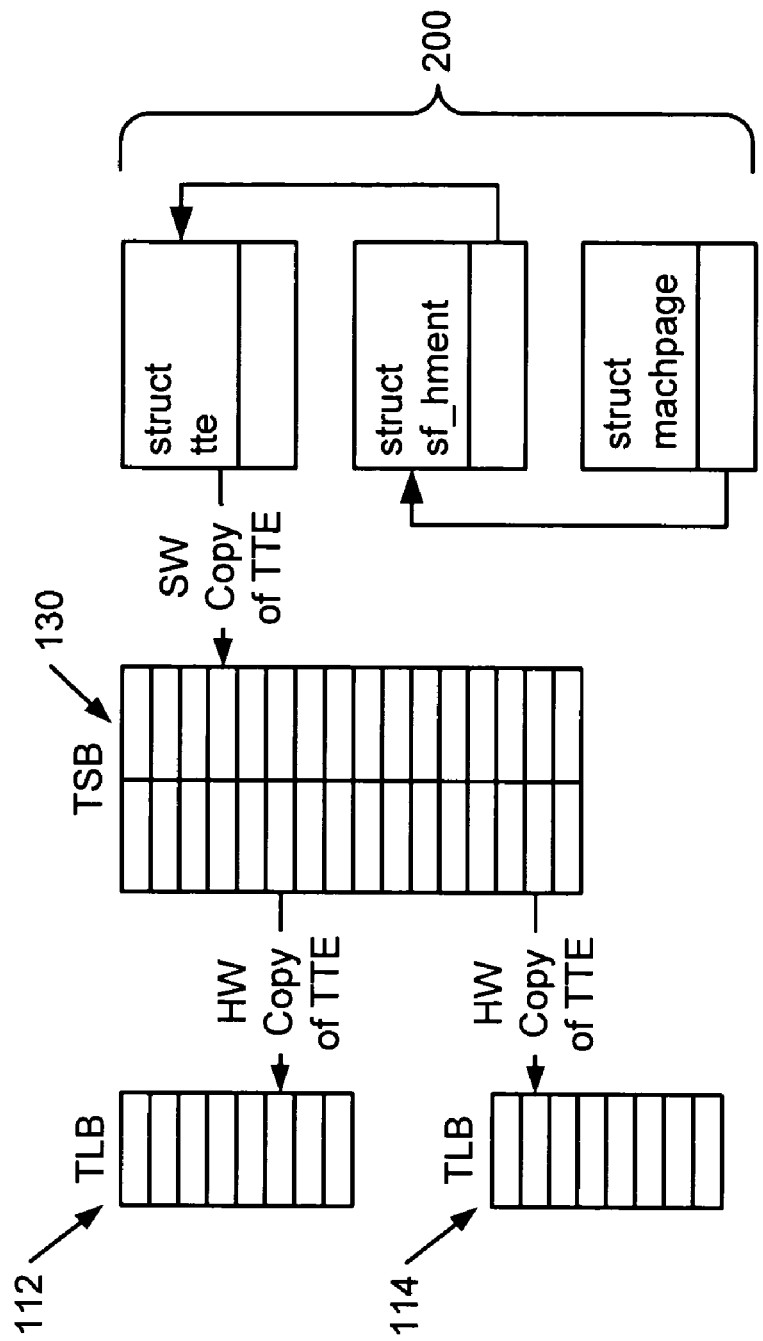
FIG. 2 shows a flow diagram of a software-based translation mechanism in accordance with one or more embodiments of the invention.

The OS (104) implements a virtual memory management system for the multiprocessor system. FIG. 2 shows a software-based translation mechanism used by the OS to fill the TLBs (112, 114) in accordance with one or more embodiments of the invention. In one embodiment, the virtual-to-physical address mapping information for a virtual memory page is known as a translation table entry and there is one TTE per virtual memory page. The OS maintains a page structure (200) per virtual memory page as the software representation of the TTE for a virtual memory page. This page structure (200) reflects the current mapping state of the represented virtual memory page.

In one embodiment, the TLBs (112, 114) contain hardware versions of the TTEs of the virtual memory pages most recently accessed by the associated processors (100, 102) (as shown in FIG. 1). The hardware version of the TTE includes a virtual page tag field, a physical page field, and a page mapping cookie field. The virtual tag field contains a virtual page number and a context number. The physical page field contains a physical page number and other information about the physical memory page. The page mapping cookie field contains a value of a page mapping cookie associated with the physical memory page represented in the physical page field. Page mapping cookies are explained further below.

In one embodiment, the OS (104) creates the hardware version of a TTE by extracting the required information from a page structure (200). The OS (104) maintains an intermediate software cache of hardware TTEs, the translation software buffer (130), because the process of converting a software representation of a TTE to a hardware version of a TTE is fairly expensive. The OS (104) first looks in the TSB (130) for a hardware version of the TTE for the virtual memory page containing the virtual address when a TLB miss occurs during the virtual address translation process. If the TTE is in the TSB (130), the OS (104) copies the TTE into the TLB. If the TTE is not in the TSB (130), the OS (104) creates a hardware version of the TTE from the page structure (200) representing the virtual memory page and places the created TTE in the TSB (130) and the TLB where the TLB miss occurred.

In one embodiment, a page mapping cookie is associated with a physical memory page and the value of the page mapping cookie changes each time the mapping of the physical memory page changes. Referring back to FIG. 1, the OS (104) maintains a page mapping cookie buffer (commonly referred to as a "PMCB") (122) on the memory controller (120). One with ordinary skill in the art will appreciate that the PMCB (122) can be located elsewhere in the system architecture, such as in a reserved portion of physical memory. The PMCB (122) holds a page mapping cookie value for each physical memory page in memory (106). The memory controller (120) receives a page mapping cookie value from the OS (104) via a special bus transaction and stores the page mapping cookie value in the PMCB (122). The memory controller (120) also receives a page mapping cookie value from either of the MMUs (108, 110) via a normal bus transaction for a memory operation, i.e., a fetch or store operation, compares the received page mapping cookie value with a page mapping cookie value stored in the PMCB (122), and signals an address translation error if the two page mapping cookie values are not the same. In one embodiment, cache A (116) and cache B (118) store a page mapping cookie value as a tag for each cache line.

Figure 3:
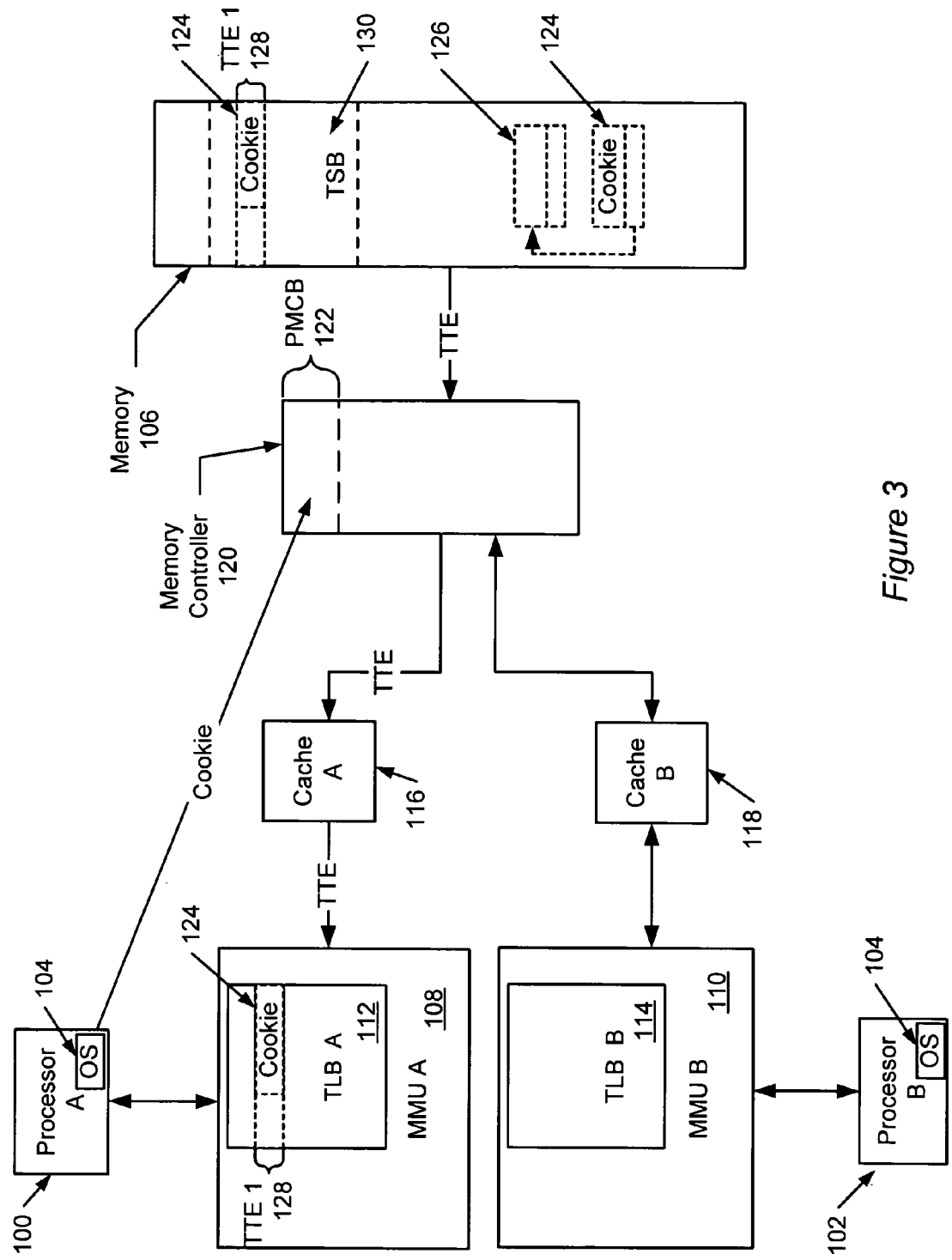
FIGS. 3–6 show flow diagrams of a virtual memory management system in accordance with one or more embodiments of the invention.

FIGS. 3–6 show flow diagrams of a virtual memory management system using page mapping cookie values in accordance with one or more embodiments of the invention. In FIG. 3, in one embodiment, a virtual memory to physical memory mapping is created by the OS (104) in response to a memory operation, i.e., a fetch or store operation, to a virtual address addressing a currently unmapped virtual memory page initiated by processor A (100). The OS (104) places the virtual memory page corresponding to the virtual address in a physical memory page, generates a new page mapping cookie value (124) denoting the mapping change, and stores the new page mapping cookie value (124) in the PMCB (122) in an entry uniquely associated with the physical memory page. The OS (104) also places the new page mapping cookie value (124) in the page structure (126) representing the virtual memory page. The OS (104) then creates TTE 1 (128) representing the virtual memory page from the information in the page structure (126) and places TTE 1 (128) in the TSB (130) and in TLB A (112). Processor B (102) has not yet referenced the virtual memory page, so TTE 1 (128) is not in TLB B (114).

Figure 4:
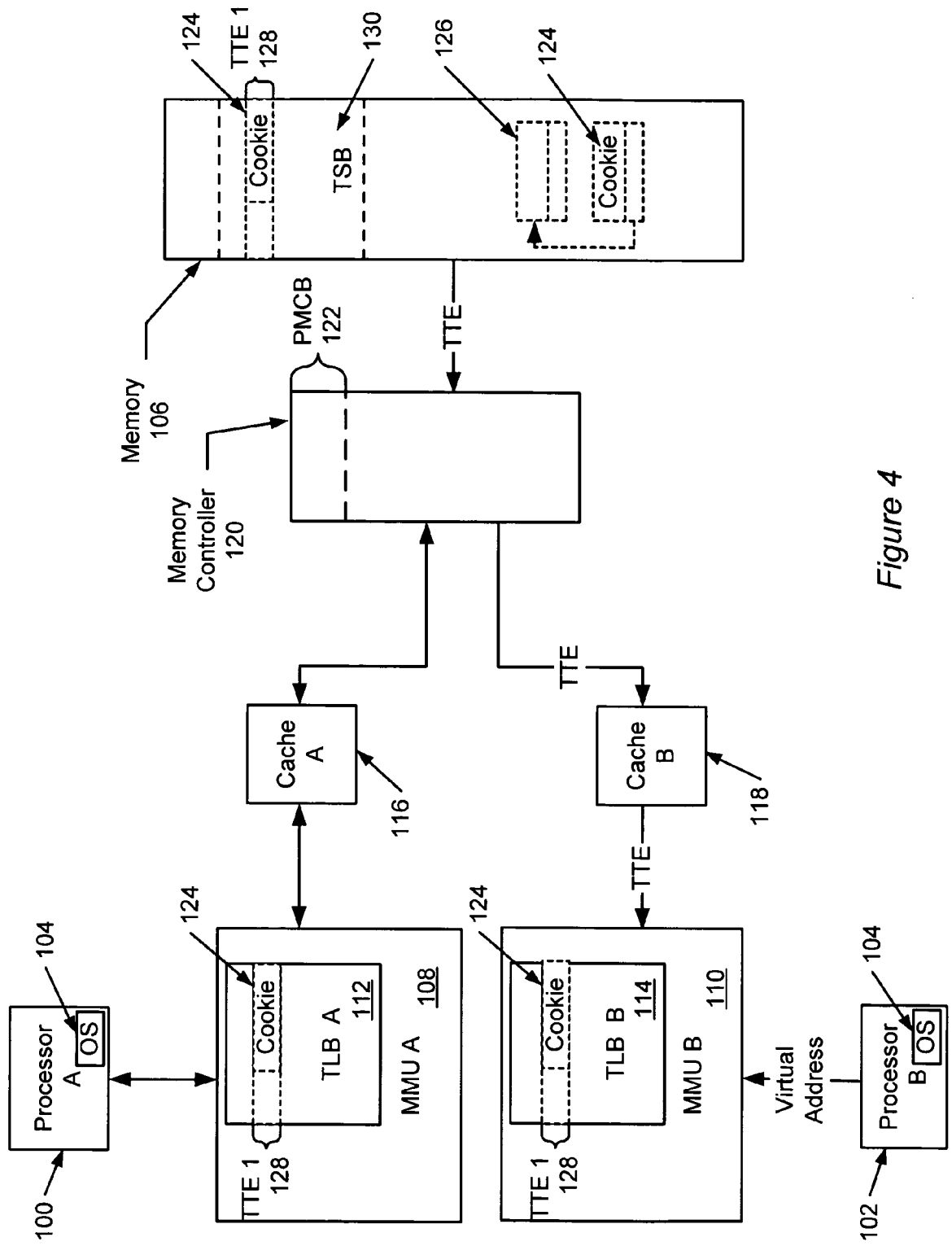

FIG. 4 shows the flow of TLB miss processing by the OS (104) in accordance with one or more embodiments of the invention. In one embodiment, a TLB miss occurs when processor B (102) initiates a memory operation to a virtual address in the virtual memory page mapped by processor A (100) because TTE 1 (128) is not currently in TLB B (114). The OS (104) locates TTE 1 (128) representing the virtual memory page in the TSB (130) and places TTE 1(128) in TLB B (114). TTE 1(128) is then used for translation of the virtual address.

Figure 5:
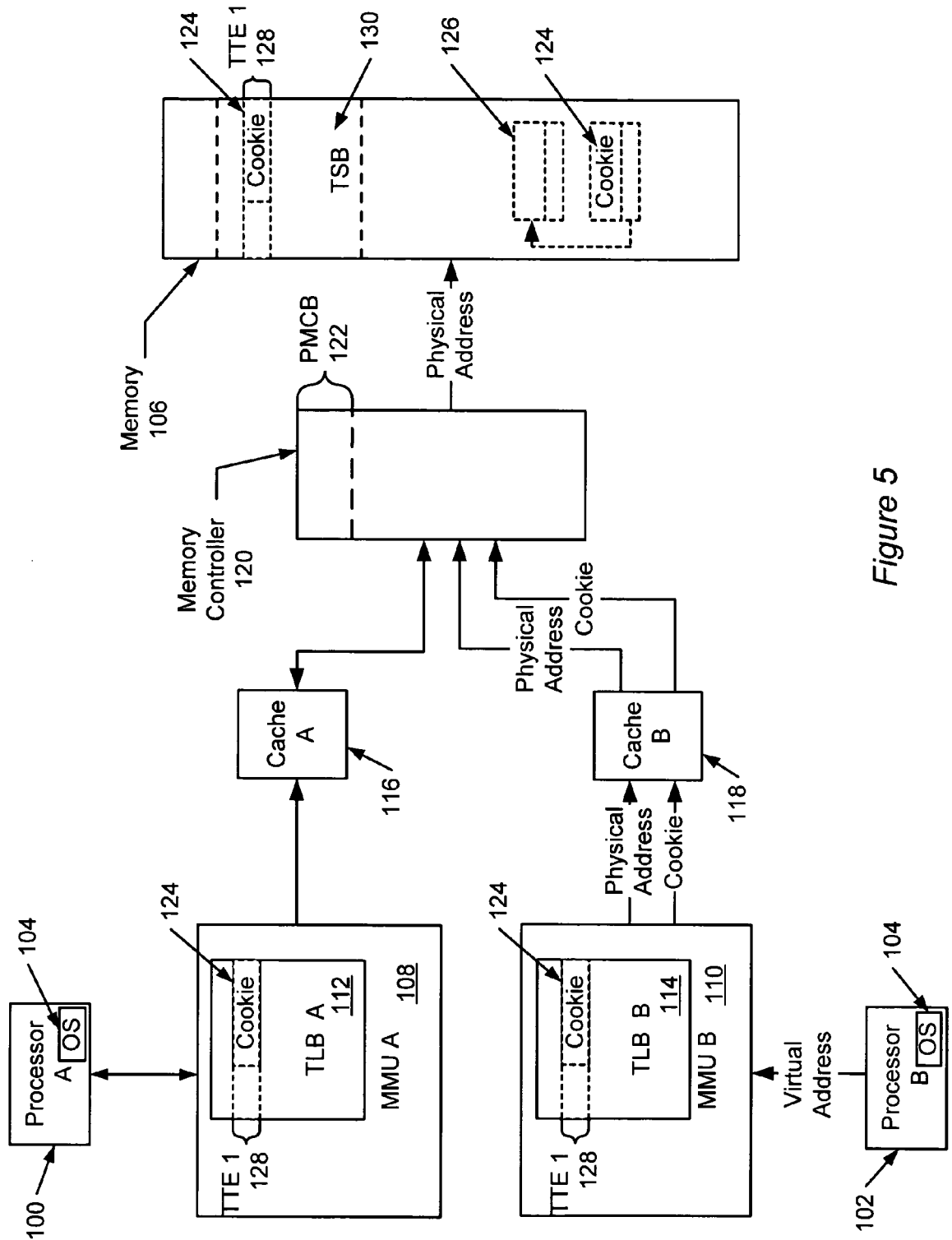

FIG. 5 shows the use of page mapping cookie values during the address translation process to ensure that a TTE stored in a TLB represents a valid mapping in accordance with one or more embodiments of the invention. In one embodiment, processor B (102) requests a memory operation by sending a virtual address referencing the virtual memory page represented by TTE 1 (128) to MMU B (110) for translation to a physical address. MMU B (110) looks in TLB B (114) for a TLB entry for the virtual memory page containing the virtual address and locates TTE 1(128). MMU B (110) uses the contents of TTE 1 (128) to create a physical address. MMU B (110) then sends the physical address and the page mapping cookie value from TTE 1 (128) to cache B (118).

In one embodiment, the physical address and the page mapping cookie value are passed to the memory controller (120) because the requested address is not in cache B (118). The memory controller (120) determines whether the virtual-to-physical page mapping is valid by comparing the received page mapping cookie value to a page mapping cookie value stored in the page mapping cookie buffer (122). The stored page mapping cookie value is the current page mapping cookie value for the physical memory page containing the received physical address.

If the mapping of the physical memory page has changed since TTE 1 (128) was loaded in TLB B (114), the comparison fails. The memory controller (120) signals an addressing error and control passes to the OS (104) to update TLB B (114). The OS (104) removes TTE 1(128), loads a new TTE for the referenced virtual memory page as described in reference to FIG. 3, and restarts the memory operation. If the two cookie values are the same, the virtual-to-physical page mapping is valid and the requested memory operation from Processor B (102) is completed. In one embodiment, if the requested memory operation is a fetch operation, the data from the physical memory address is placed in cache B (118) and is tagged with the received page mapping cookie value.

Figure 6:
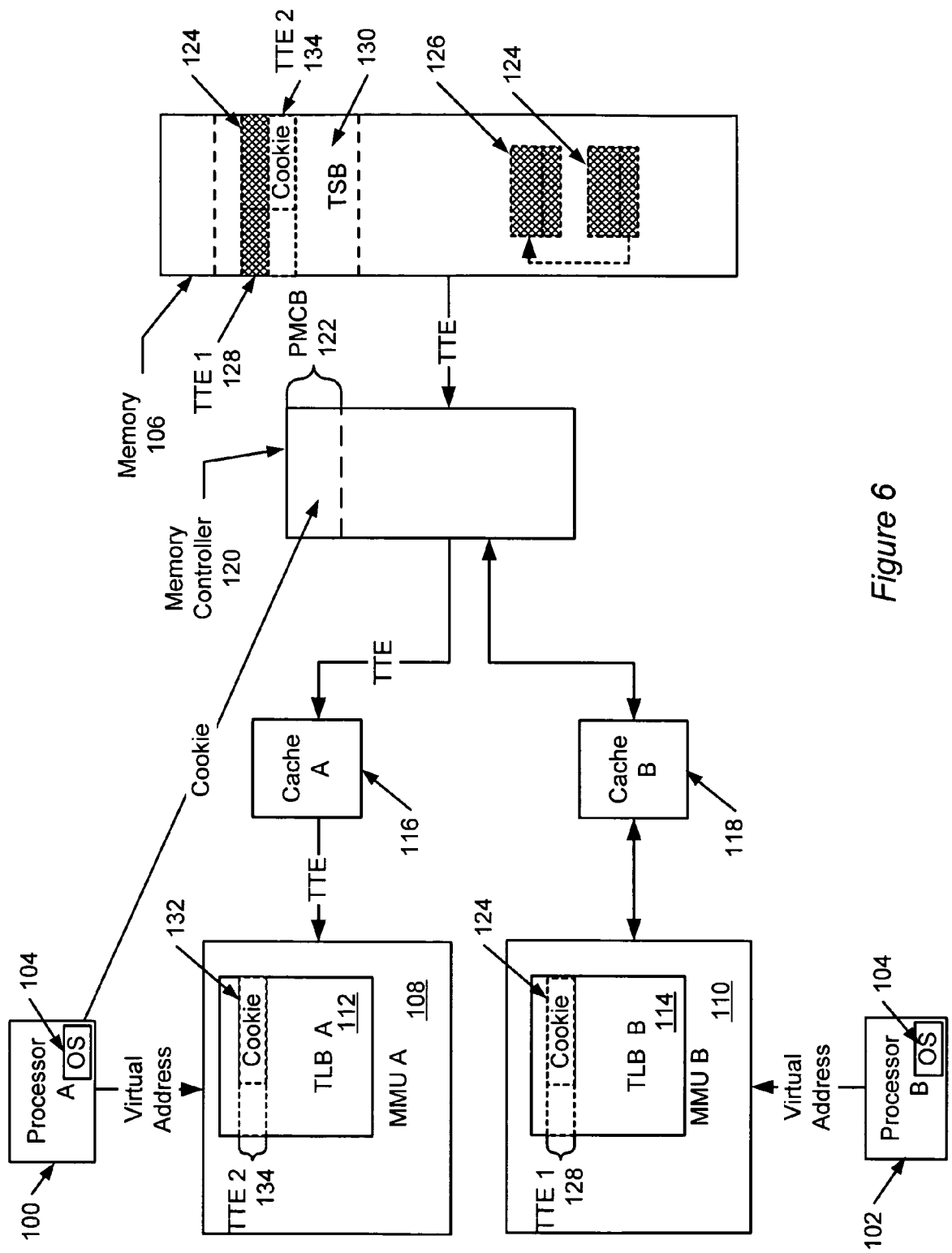

FIG. 6 shows the flow of demapping a virtual memory page in accordance with one or more embodiments of the invention. In one embodiment, the OS (104) maps a new virtual memory page into memory in response to a page fault caused by a virtual address access by Processor A (100). The OS (104) frees up a physical memory page for the new virtual memory page because all physical memory pages are in use. The OS (104), using a known algorithm for determining which virtual memory page to remove from physical memory, selects the physical memory page represented in the mapping of TTE 1(128). The OS (104) then demaps and swaps out the virtual memory page currently in the selected physical memory page and updates the associated page structure (126). The OS (104) also removes TTE 1 (128) from the TSB (130) and from TLB A (112) and, in one embodiment, any entries in cache A (116) that are tagged with the page mapping cookie value in TTE 1 (128).

The OS (104) creates a new mapping entry, TTE 2 (134), for the new virtual memory page as described above in reference to FIG. 3. In one embodiment, the cache protocol snoops the special bus transaction changing the page mapping cookie value associated with the physical memory page and removes any entries in cache B (118) that are tagged with the previous page mapping cookie value. TTE 1 (128) remains in TLB B (114) but is no longer a valid mapping entry. TTE 1 (128) is removed from TLB B (114) during the ongoing execution of instructions on processor B (102). For example, in one embodiment, TLB miss processing on processor B (102) may remove TTE 1 (128) to make room for a new TTE. Or, in one embodiment, TTE 1 (128) is replaced with a TTE for a new virtual-to-physical mapping of the virtual memory page in response to an addressing error as discussed above in reference to FIG. 5 if processor B (102) initiates a memory operation at a virtual address represented by TTE 1 (128).

Figure 7:
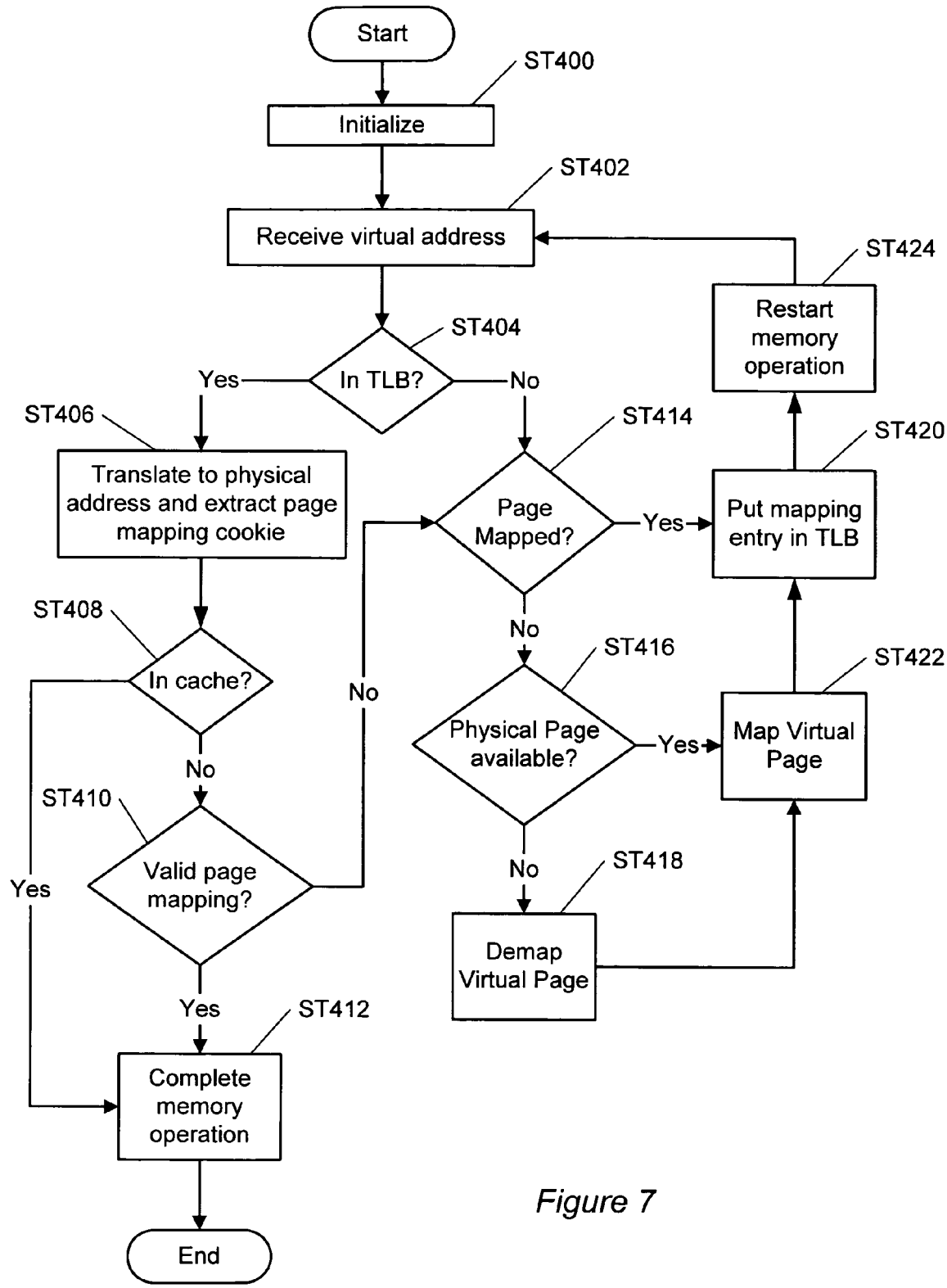
FIG. 7 shows a flowchart of a method for managing virtual memory in accordance with one or more embodiments of the invention.

FIG. 7 shows a flowchart of a method for managing virtual memory using page mapping cookies in accordance with one or more embodiments of the invention. While the method is described below such that an operating system performs some of the actions of the method, one skilled in the art can appreciate that the actions attributed to an operating system may be performed by any software designed to control the hardware of a computer system in order to allow application programs to make use of the hardware.

First, in one embodiment, the virtual memory management system is initialized when the multiprocessor system is booted (Step 400). The OS initializes the page mapping cookie buffer, creates mapping entries for virtual memory pages used by the OS, and places the mapping entries in the translation lookaside buffer of the processor where the OS is executing. Once the virtual memory management system is initialized, applications begin executing on the processors of the multiprocessor system.

During execution, in one embodiment, a processor initiates a memory operation by sending a virtual memory address to the processor's memory management unit. The memory management unit receives the virtual address (Step 402) and searches the translation lookaside buffer for a mapping entry corresponding to the virtual memory page containing the virtual address (Step 404). If a mapping entry is found in the TLB, the TLB returns the physical page number and the page mapping cookie value from the mapping entry to the memory management unit. The memory management unit creates a physical address from the physical page number and the virtual address and, in one embodiment, passes the physical address and the page mapping cookie value to a cache (Step 406). If the physical address is in the cache (Step 408), the memory operation is completed (Step 412).

Still referring to FIG. 7, in one embodiment, if the physical address is not in the cache (Step 408), the physical address and the page mapping cookie value are passed to the memory controller. At this point, the page mapping may not be valid because, for example, another processor has caused the virtual memory page to be demapped, leaving a stale mapping entry in other processors' TLBs. In one embodiment, the memory controller checks the validity of the page mapping by comparing the received page mapping cookie value to a stored page mapping cookie value (Step 410). As previously discussed, in one embodiment, the stored page mapping cookie value is changed by the OS each time a virtual memory page is mapped into or demapped from the physical memory page. If the cookie values are the same, the page mapping is valid and the memory operation is completed (Step 412). In one embodiment, if the memory operation is a fetch request, the requested instruction or data is fetched from the physical address, placed in a cache, and tagged with the page mapping cookie value.

If the page mapping is not valid (Step 410) or if a mapping entry is not found in the TLB (Step 404) (i.e., a TLB miss), the OS is invoked to provide a mapping entry for the virtual memory page. Next, the OS determines whether a mapping entry for the virtual memory page is available (Step 414). In one embodiment, a mapping entry may already exist, for example, because another processor has previously accessed the virtual memory page. If a mapping entry is available, the OS places the mapping entry in the TLB (Step 420) and restarts the memory operation (Step 424).

If a mapping entry is not available, the virtual memory page is mapped into physical memory. First, the OS determines whether a physical memory page is available (Step 416). If a physical memory page is available, the virtual memory page is swapped into the physical memory page and a mapping entry is created (Step 422). The OS generates a new page mapping cookie value to denote the new mapping of the physical memory page and, in one embodiment, sends the new page mapping cookie value to the memory controller using a special bus transaction. The memory controller replaces the page mapping cookie value for the physical memory page stored in the page mapping cookie buffer with the new page mapping cookie value. The OS also stores the new page mapping cookie value in the mapping entry. The OS then places the mapping entry in the TLB (Step 420) and restarts the memory operation (Step 424).

Continuing with FIG. 7, if a physical memory page is not available (Step 416), the OS makes room for the new virtual memory page by demapping a virtual memory page already in physical memory (Step 418) in accordance with one embodiment of the invention. Using a known algorithm, the OS selects a virtual memory page to remove from memory. The OS generates a new mapping cookie value to denote the removal of the virtual memory page from the physical memory page and, in one embodiment, uses a special bus transaction to send the new page mapping cookie value to the memory controller. The cache coherency protocol detects this special bus transaction and invalidates any entries in the caches of the processors that are tagged with the old page mapping cookie value. In one embodiment, the memory controller replaces the page mapping cookie value for the physical memory page stored in the page mapping cookie buffer with the new page mapping cookie value. The selected virtual memory page is then swapped out and the physical memory page is made available. The OS then maps the virtual memory page into the physical memory page (Step 422) as described above, places the mapping entry in the TLB (Step 420), and restarts the memory operation (Step 424) such that the memory management unit again receives the virtual address.

Embodiments of the present invention improve the performance of virtual memory on a shared-memory, symmetric multiprocessor system. Rather than requiring all processors in the system to stop program execution and update TLBs when a virtual memory page is demapped, page mapping cookies are used during program execution to detect an attempt to access a virtual memory address in a demapped virtual memory page. The operating system performs a TLB update operation on a processor only if the processor actually attempts to access a demapped virtual page. Further, in some embodiments, rather than requiring all processors to halt and update caches when a virtual memory page is demapped, a cache coherency protocol snoops special operations associated with page mapping cookies and removes cache lines affected by demapping a virtual memory page from the processors' caches concurrently with program execution.

Figure 8:
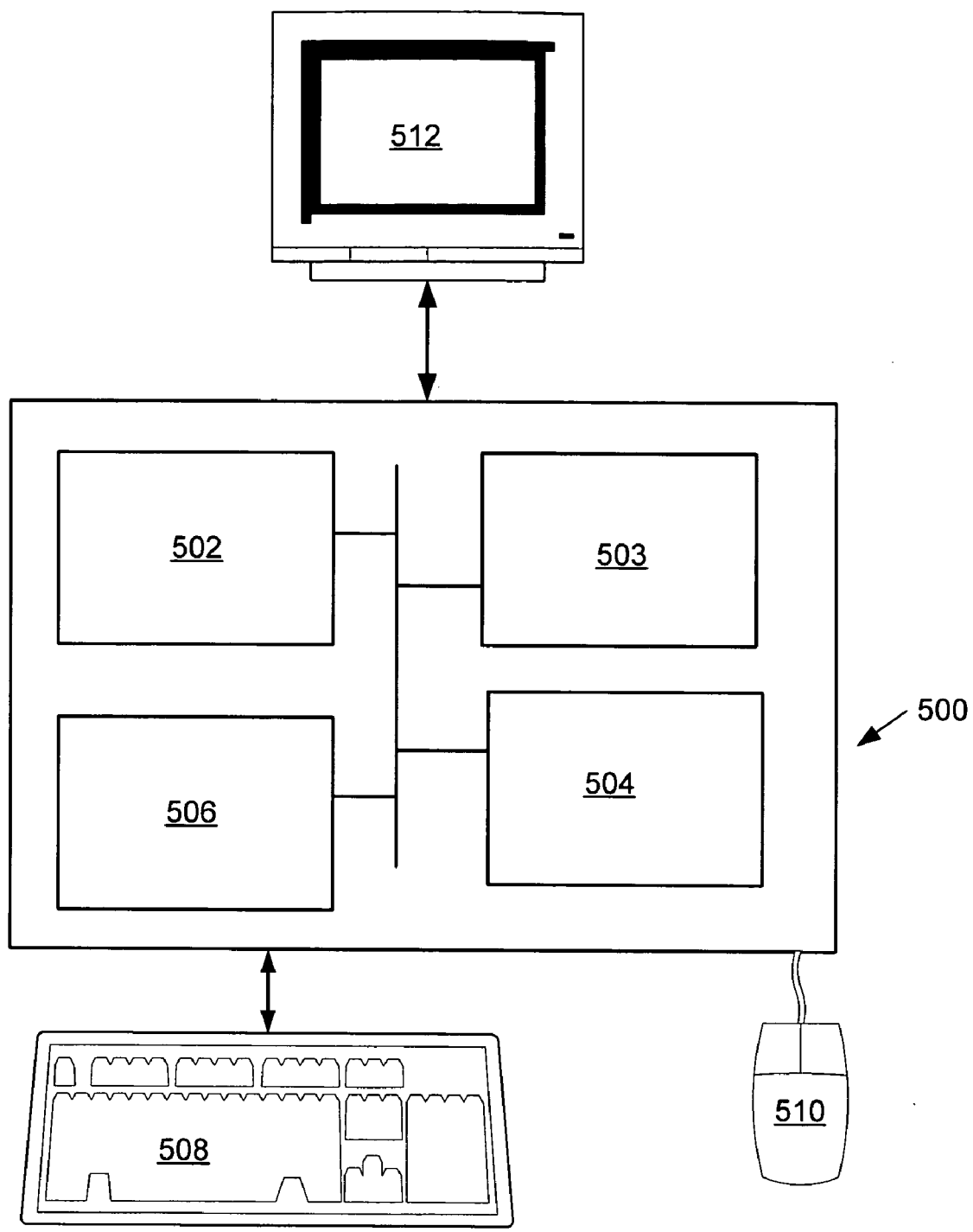
FIG. 8 shows a networked computer system in accordance with one or more embodiments of the invention.

An embodiment of the invention may be implemented on virtually any type of computer having a multiprocessor architecture. For example, as shown in FIG. 8, a computer system (500) includes multiple processors (502, 503), associated memory (504), a storage device (506), and numerous other elements typical of today's computers (not shown). The computer (500) may also include input means, such as a keyboard (508) and a mouse (510), and output means, such as a monitor (512). The computer system (500) is connected to a local area network (LAN) or a wide area network via a network interface connection (not shown). The computer system (500) may also be interconnected in a network cluster (not shown) via a cluster interconnect (not shown) such that the computer (500) may access remote memory (not shown) on other computers (not shown) included in the network cluster (not shown). Those with ordinary skill in the art will appreciate that these input and output means may take other forms. Further, those with ordinary skill in the art will appreciate that one or more elements of the aforementioned computer (500) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system comprising:
a plurality of processors;
a memory operatively connected to the plurality of processors;
a storage device; and
software instructions stored on the storage device for enabling the computer system to:
place a first mapping entry in a first translation lookaside buffer (TLB) associated with a first processor, wherein the first processor is one of the plurality of processors and wherein the first mapping entry is associated with: a virtual memory address, a first physical memory address corresponding to the virtual memory address, and a first page mapping cookie value associated with the first physical memory address;
place the first page mapping cookie value and the first physical memory address in a page mapping cookie buffer (PMCB), wherein the PMCB is adapted to communicate with the plurality of processors;
receive a memory operation comprising the virtual memory address by a second processor, wherein the second processor is one of the plurality of processors and wherein the second processor is associated with a second TLB;
translate the virtual memory address to obtain a second physical memory address using a second mapping entry associated with the virtual memory address, wherein the second mapping entry is located in the second TLB;
extract a second page mapping cookie value from the second mapping entry;
determine whether the second page mapping cookie value is equal to the first page mapping cookie value in the PMCB;
if the second page mapping cookie value is equal to the first page mapping cookie value, complete the memory operation using the second physical memory address; and
if the second page mapping cookie value is not equal to the first page mapping cookie value, restart the memory operation.

2. The computer system of claim 1, further comprising:
a memory controller operatively connected to the plurality of processors, the PMCB, and the memory, wherein the memory controller determines whether the second page mapping cookie value is equal to the first page mapping cookie value in the PMCB.

3. The computer system of claim 1, further comprising:
a cache operatively connected to the second processor, wherein the software instructions further enable the computer system to signal a cache coherency protocol to remove cache entries tagged with the second page mapping cookie value from the cache if the memory operation is restarted.

4. The computer system of claim 1, wherein the first processor of the plurality of processors causes the first mapping entry to be placed in first TLB and the second processor of the plurality of processors causes the second mapping entry to be placed in the second TLB.

5. The computer system of claim 1, wherein the software instructions further enable the computer system to:
place data associated with a second virtual memory address in the first physical memory address;
associate a third page mapping cookie value with the first physical memory address; and
update the first page mapping cookie value in the PMCB to contain the third page mapping cookie value.

6. The computer system of claim 1, wherein software instructions stored on the storage device for enabling the computer system to restart the memory operation comprise instructions for:
removing the second mapping entry from the second TLB; and
creating a third mapping entry in the second TLB, wherein the third mapping entry is associated to the virtual memory address, the first physical memory address, and the first page mapping cookie value.

7. A method for managing virtual memory comprising:
placing a first mapping entry in a first translation lookaside buffer (TLB) associated with a first processor, wherein the first processor is one of a plurality of processors and wherein the first mapping entry is associated with: a virtual memory address, a first physical memory address corresponding to the virtual memory address, and a first page mapping cookie value associated with the first physical memory address;
placing the first page mapping cookie value and the first physical memory address in a page mapping cookie buffer (PMCB), wherein the PMCB is adapted to communicate with the plurality of processors;
receiving a memory operation comprising the virtual memory address by a second processor, wherein the second processor is one of the plurality of processors and wherein the second processor is associated with a second TLB;
translating the virtual memory address to obtain a second physical memory address using a second mapping entry associated with the virtual memory address, wherein the second mapping entry is located in the second TLB;
extracting a second page mapping cookie value from the second mapping entry;
determining whether the second page mapping cookie value is equal to the first page mapping cookie value in the PMCB;
if the second page mapping cookie value is equal to the first page mapping cookie value, completing the memory operation using the second physical memory address; and if the second page mapping cookie value is not equal to the first page mapping cookie value, restarting the memory operation.

8. The method of claim 7, wherein the first processor causes the first mapping entry to be placed in the first TLB and the second processor causes the second mapping entry to be placed in the second TLB.

9. The method of claim 7, wherein the PMCB is located on a memory controller.

10. The method of claim 9, wherein determining whether the second page mapping cookie value is equal to the first page mapping cookie value comprises:

receiving the second physical memory address and the second page mapping cookie value on the memory controller; and determining, by the memory controller, whether the second page mapping cookie value is equal to the first page mapping cookie value.

11. The method of claim 7, further comprising:

placing a third mapping entry in a third TLB, wherein the third mapping entry is associated with the virtual memory address and wherein the third TLB is associated with a third processor of the plurality of processors;

associating a third page mapping cookie value with the third mapping entry; and updating the first page mapping cookie value in the PMCB to include the third page mapping cookie value.

12. The method of claim 7, wherein completing the memory operation further comprises placing data associated with the second physical memory address in a cache of the second processor if the memory operation is a fetch operation.

13. The method of claim 7, wherein restarting the memory operation comprises:

removing the second mapping entry from the second TLB; and creating a third mapping entry in the second TLB, wherein the third mapping entry is associated to the virtual memory address, the first physical memory address, and the first page mapping cookie value.

14. The method of claim 13, wherein restarting the memory operation further comprises:

executing a cache coherency protocol to remove cache entries tagged with the second page mapping cookie value from a cache of the second processor.

15. The method of claim 14, wherein placing the first page mapping cookie value further comprises:

sending the first page mapping cookie value to a memory controller using a special bus transaction; and wherein executing the cache coherency protocol further comprises:

snooping the special bus transaction.

16. A virtual memory management system comprising:

a first processor of a plurality of processors comprising a first memory management unit (MMU) and a first translation lookaside buffer (TLB), wherein the first TLB is operatively connected to the first MMU and wherein the first TLB stores a first mapping entry associated to a virtual memory address, a first physical memory address corresponding to the virtual memory address, and a first page mapping cookie value associated with the first physical memory address;

a second processor of the plurality of processors comprising a second MMU and a second TLB, wherein the second TLB is operatively connected to the second MMU and wherein the second TLB stores a second mapping entry associated to the virtual memory address, a second physical memory address corresponding to the virtual memory address, and a second page mapping cookie value associated with the second physical memory address;

a memory controller operatively connected to the first MMU and to the second MMU, wherein the memory controller is configured to:

receive the first page mapping cookie value and the first physical memory address;

receive the second page mapping cookie value and the second physical memory address;

determine whether the second page mapping cookie value is equal to the first page mapping cookie value; and signal an address translation error if the second page mapping cookie value is not equal to the first page mapping cookie value; and a memory operatively connected to the memory controller wherein the memory comprises at least one selected from a group consisting of the first physical memory address and the second physical memory address.

17. The system of claim 16, further comprising:

a first cache associated to the first processor, wherein the first cache is configured to store a copy of data stored at the first physical memory address, wherein the copy is tagged with the first page mapping cookie value.

18. The virtual memory management system of claim 16, further comprising:

a page mapping cookie buffer (PMCB) operatively connected to the memory controller wherein the PMCB comprises the first page mapping cookie value and the second page mapping cookie value.

* * * * *